(12) United States Patent
Lee et al.

(10) Patent No.: US 10,481,753 B2
(45) Date of Patent: Nov. 19, 2019

(54) DISPLAY DEVICE AND METHOD OF OPERATING THE SAME

(71) Applicant: LG ELECTRONICS INC., Seoul (KR)

(72) Inventors: Byunghun Lee, Seoul (KR); Kunsik Lee, Seoul (KR); Taejun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 385 days.

(21) Appl. No.: 15/349,843

(22) Filed: Nov. 11, 2016

(65) Prior Publication Data

US 2017/0308261 A1 Oct. 26, 2017

(30) Foreign Application Priority Data

Apr. 25, 2016 (KR) .......................... 10-2016-0050401

(51) Int. Cl.
*G06F 3/048* (2013.01)
*G06F 3/0488* (2013.01)
(Continued)

(52) U.S. Cl.
CPC ........ *G06F 3/04812* (2013.01); *G06F 3/0482* (2013.01); *G09G 5/026* (2013.01);
(Continued)

(58) Field of Classification Search
CPC ........ G06F 3/0481; G06F 2203/04804; H04N 21/4312; H04N 21/4438; H04N 21/482
See application file for complete search history.

(56) References Cited

U.S. PATENT DOCUMENTS 6,763,522 B1 * 7/2004 Kondo ............... H04N 5/44543
348/E5.097
7,231,588 B2 * 6/2007 Wang ..................... G09G 5/363
345/214
(Continued)

FOREIGN PATENT DOCUMENTS

| KR | 1020100009173 | 1/2010 |
|---|---|---|
| KR | 101078847 | 10/2011 |
| WO | 2013151368 | 10/2013 |

OTHER PUBLICATIONS

PCT International Application No. PCT/KR2017/002369, International Search Report dated Jul. 5, 2017, 3 pages.
(Continued)

*Primary Examiner* — Jordany Nunez
(74) *Attorney, Agent, or Firm* — Lee, Hong, Degerman, Kang & Waimey PC

(57) ABSTRACT

A display device includes a display for displaying at least one piece of content, a user input interface for receiving a signal from a remote control device, and a controller for controlling operation of the display device. The controller performs control to display a video of first content in an overall area of a first layer of a screen, to display a first on screen display (OSD) window having predetermined first transparency in a first area of a second layer of the screen upon receiving a first OSD window output request signal, and to change the first transparency to predetermined second transparency when a pointer is located in the first area of the second layer of the screen.

16 Claims, 14 Drawing Sheets

(51) Int. Cl.
   *G06F 3/0481*   (2013.01)
   *G09G 5/02*     (2006.01)
   *G06F 3/0482*   (2013.01)
   *H04N 21/431*   (2011.01)
   *H04N 21/485*   (2011.01)
   *H04N 21/443*   (2011.01)
   *H04N 21/482*   (2011.01)

(52) U.S. Cl.
   CPC ..... *H04N 21/4318* (2013.01); *H04N 21/4438* (2013.01); *H04N 21/4826* (2013.01); *H04N 21/4854* (2013.01)

(56) References Cited

U.S. PATENT DOCUMENTS

| | | | | |
|---|---|---|---|---|
| 7,610,552 | B2* | 10/2009 | Kikinis | G06F 3/04815 715/716 |
| 8,010,162 | B2* | 8/2011 | Kim | H04M 1/72522 455/566 |
| 8,599,315 | B2 | 12/2013 | Hanko et al. | |
| 8,930,838 | B2* | 1/2015 | Kang | H04N 13/361 715/765 |
| 9,319,734 | B2 | 4/2016 | Hong et al. | |
| 2009/0244379 | A1* | 10/2009 | Tsai | H04N 5/44504 348/569 |
| 2009/0295998 | A1* | 12/2009 | Nobori | H04N 5/44591 348/565 |
| 2010/0275143 | A1 | 10/2010 | Fu et al. | |
| 2010/0277645 | A1* | 11/2010 | Miura | G06T 3/4084 348/557 |
| 2011/0227911 | A1* | 9/2011 | Joo | H04N 13/156 345/419 |
| 2011/0296327 | A1* | 12/2011 | Kang | H04N 13/361 715/768 |
| 2011/0310123 | A1* | 12/2011 | Matsubara | H04N 5/44582 345/634 |
| 2012/0174144 | A1* | 7/2012 | Flores Xavier | H04H 60/31 725/14 |
| 2014/0059615 | A1* | 2/2014 | Sirpal | G06F 3/017 725/52 |
| 2014/0059616 | A1 | 2/2014 | Hanko et al. | |
| 2014/0109125 | A1 | 4/2014 | Kim et al. | |
| 2014/0337891 | A1* | 11/2014 | Jung | H04N 5/4403 725/43 |
| 2015/0058893 | A1 | 2/2015 | Hong et al. | |
| 2016/0029085 | A1* | 1/2016 | Mountain | H04N 21/4583 725/43 |
| 2017/0085677 | A1* | 3/2017 | Babu | H04L 67/36 |

OTHER PUBLICATIONS

European Patent Office Application Serial No. 17789770.9, Search Report dated Sep. 16, 2019, 11 pages.

* cited by examiner

FIG. 5
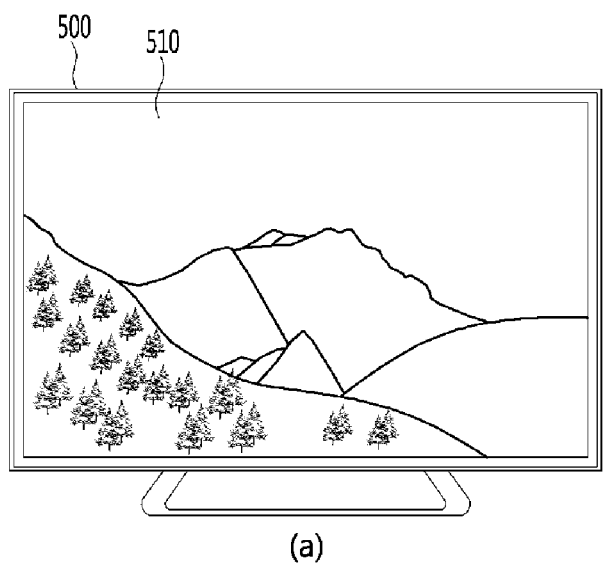
(a)
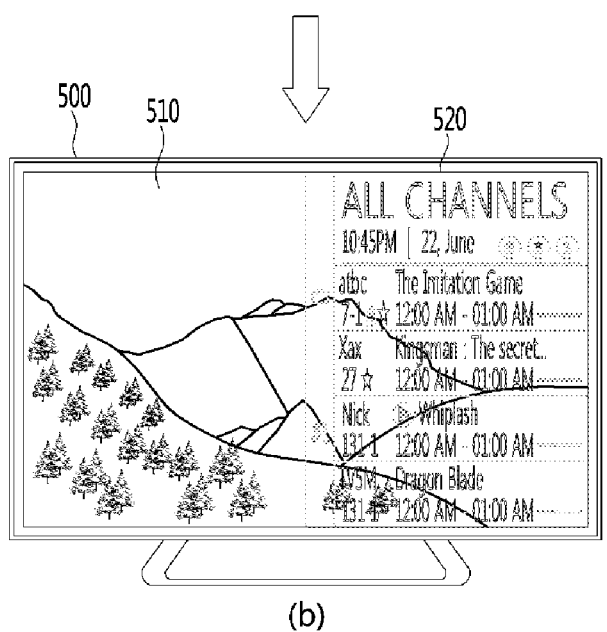
(b)

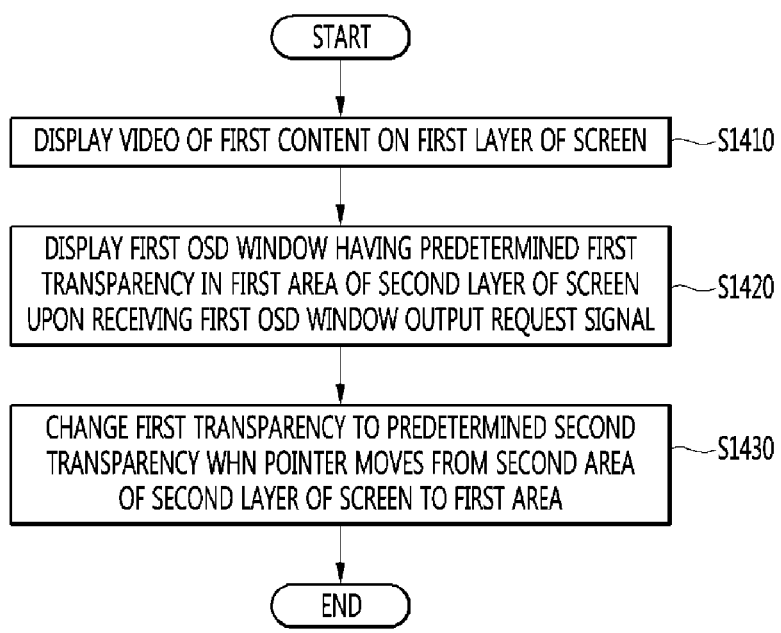

DISPLAY DEVICE AND METHOD OF OPERATING THE SAME

CROSS-REFERENCE TO RELATED APPLICATIONS

Pursuant to 35 U.S.C. § 119(a), this application claims the benefit of earlier filing date and right of priority to Korean Patent Application No. 10-2016-0050401, filed on Apr. 25, 2016, the contents of which are hereby incorporated by reference herein in its entirety.

TECHNICAL FIELD

The present invention relates to a display device and a method of operating the same.

BACKGROUND ART

A digital TV service using a wired or wireless communication network has come into wide use. The digital TV service may provide various services which cannot be provided by an existing analog broadcast service.

For example, an Internet protocol television (IPTV) service or a smart TV service which is a digital TV service provides interactivity for enabling a user to actively select a type of a program to be viewed, a viewing time, etc. The IPTV service or the smart TV service may provide various additional services, e.g., Internet search, home shopping, online games, etc. based on such interactivity.

In addition, recently, a graphical user interface (GUI) for a user is provided using an on screen display (OSD) and key input is received from the user to operate a device according to input.

DISCLOSURE

Technical Problem

An object of the present invention is to adjust transparency of an OSD window to increase image utilization of content.

Another object of the present invention is to adjust transparency of an OSD window using a remote control device connected to a display device to increase user convenience.

Another object of the present invention is to enable a user to conveniently control an OSD window by performing operation changed depending on whether a pointer is located in an area in which the OSD window is displayed.

Technical Solution

The object of the present invention can be achieved by providing a display device including a display for displaying at least one piece of content, a user input interface for receiving a signal from a remote control device, and a controller for controlling operation of the display device, wherein the controller performs control to display a video of first content in an overall area of a first layer of a screen, to display a first on screen display (OSD) window having predetermined first transparency in a first area of a second layer of the screen upon receiving a first OSD window output request signal, and to change the first transparency to predetermined second transparency when a pointer is located in the first area of the second layer of the screen.

In the display device according to the embodiment of the present invention, the first OSD window may include a plurality of items, and, when the pointer points at least one of the plurality of items, the controller may perform control to highlight and display the item being pointed at.

In the display device according to the embodiment of the present invention, the first OSD window may include a plurality of channel selection items, and, when a signal for selecting one of the plurality of channel selection items is received, the controller may perform control to display a video of second content received from a channel corresponding to the selected item in an overall area of the first layer of the screen.

In the display device according to the embodiment of the present invention, the first OSD window may include a plurality of screen setting items, and, when a signal for selecting one of the plurality of screen setting items is received, the controller may perform control to display a video of first content, to which a screen setting value corresponding to the selected item is applied, on the first layer of the screen.

In the display device according to the embodiment of the present invention, when a predetermined time has elapsed after the first OSD window is displayed, the controller may perform control to display a second OSD window including a plurality of recommended content items and having the first transparency in the first area of the second layer of the screen.

Advantageous Effects

The effects of the present invention are as follows.

According to one embodiment of the present invention, it is possible to adjust transparency of an OSD window to increase image utilization of content.

According to another embodiment of the present invention, it is possible to adjust transparency of an OSD window using a remote control device connected to a display device to increase user convenience.

According to another embodiment of the present invention, it is possible to enable a user to conveniently control an OSD window by performing operation changed depending on whether a pointer is located in an area in which the OSD window is displayed.

DESCRIPTION OF DRAWINGS

FIG. 5 is a diagram showing a method of displaying an OSD window in a display device according to an embodiment of the present invention.

FIG. 14 is a flowchart illustrating a method of controlling a display device according to an embodiment of the present invention.

BEST MODE

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, can have an easy-to-use interface such as a writing input device, a touch screen, or a spatial remote controller as an internet function is added while fulfilling the broadcast receiving function. Then, with the support of a wired or wireless internet function, it is possible to perform an e-mail, web browsing, banking, or game function in access to internet and computers. In order for such various functions, standardized general purpose OS can be used.

Accordingly, since various applications are freely added or deleted on a general purpose OS kernel, a display device described in this present invention, for example, can perform various user-friendly functions. The display device, in more detail, can be network TV, HBBTV, smart TV, LED TV, OLED TV, and so on and in some cases, can be applied to a smartphone.

Figure 1:
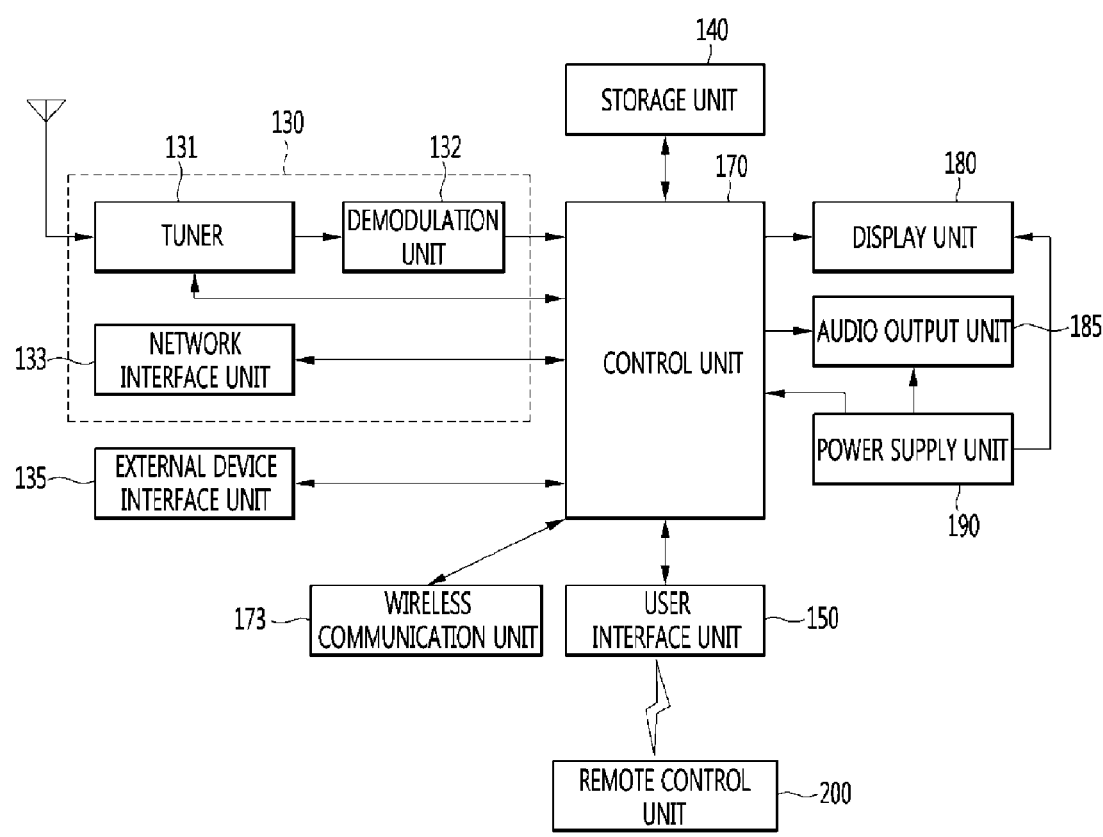
FIG. 1 is a block diagram showing the configuration of a display device according to an embodiment of the present invention.

FIG. 1 is a block diagram illustrating a configuration of a display device according to an embodiment of the present invention.

Referring to FIG. 1, a display device 100 can include a broadcast reception unit 130, an external device interface unit 135, a storage unit 140, a user input interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface 135 can provide a connection path between the display device 100 and an external device. The external device interface 135 can receive at least one of image and audio output from an external device that is wirelessly or wiredly connected to the display device 100 and deliver it to the control unit. The external device interface unit 135 can include a plurality of external input terminals. The plurality of external input terminals can include an RGB terminal, at least one High Definition Multimedia Interface (HDMI) terminal, and a component terminal.

An image signal of an external device inputted through the external device interface unit 135 can be output through the display unit 180. A sound signal of an external device inputted through the external device interface unit 135 can be output through the audio output unit 185.

An external device connectable to the external device interface unit 130 can be one of a set-top box, a Blu-ray player, a DVD player, a game console, a sound bar, a smartphone, a PC, a USB Memory, and a home theater system but this is just exemplary.

The network interface unit 133 can provide an interface for connecting the display device 100 to a wired/wireless network including internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily store image, voice, or data signals output from the external device interface unit 135 or the network interface unit 133 and can store information on a predetermined image through a channel memory function.

The storage unit 140 can store an application or an application list inputted from the external device interface unit 135 or the network interface unit 133.

The display device 100 can play content files (for example, video files, still image files, music files, document files, application files, and so on) stored in the storage unit 140 and provide them to a user.

The user input interface unit 150 can deliver signals inputted from a user to the control unit 170 or deliver signals from the control unit 170 to a user. For example, the user input interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user input interface unit 150 can deliver, to the control unit 170, control signals inputted from local keys (not shown) such as a power key, a channel key, a volume key, and a setting key.

Image signals that are image-processed in the control unit 170 can be inputted to the display unit 180 and displayed as an image corresponding to corresponding image signals. Additionally, image signals that are image-processed in the control unit 170 can be inputted to an external output device through the external device interface unit 135.

Voice signals processed in the control unit 170 can be output to the audio output unit 185. Additionally, voice signals processed in the control unit 170 can be inputted to an external output device through the external device interface unit 135.

Besides that, the control module 170 can control overall operations in the display device 100.

Additionally, the control unit 170 can control the display device 100 by a user command or internal program inputted through the user input interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user input interface unit 150, the control unit 170 can output image signals or voice signals of an external device such as a camera or a camcorder, which are inputted through the external device interface unit 135, through the display unit 180 or the audio output unit 185.

Moreover, the control unit 170 can control the display unit 180 to display images and control broadcast images inputted through the tuner 131, external input images inputted through the external device interface unit 135, images inputted through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content inputted from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The wireless communication unit 173 can be provided separated from the external device interface unit 135 and can be included in the external device interface unit 135.

The display unit 180 can convert image signals, data signals, or OSD signals, which are processed in the control unit 170, or images signals or data signals, which are received in the external device interface unit 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

Figure 2:
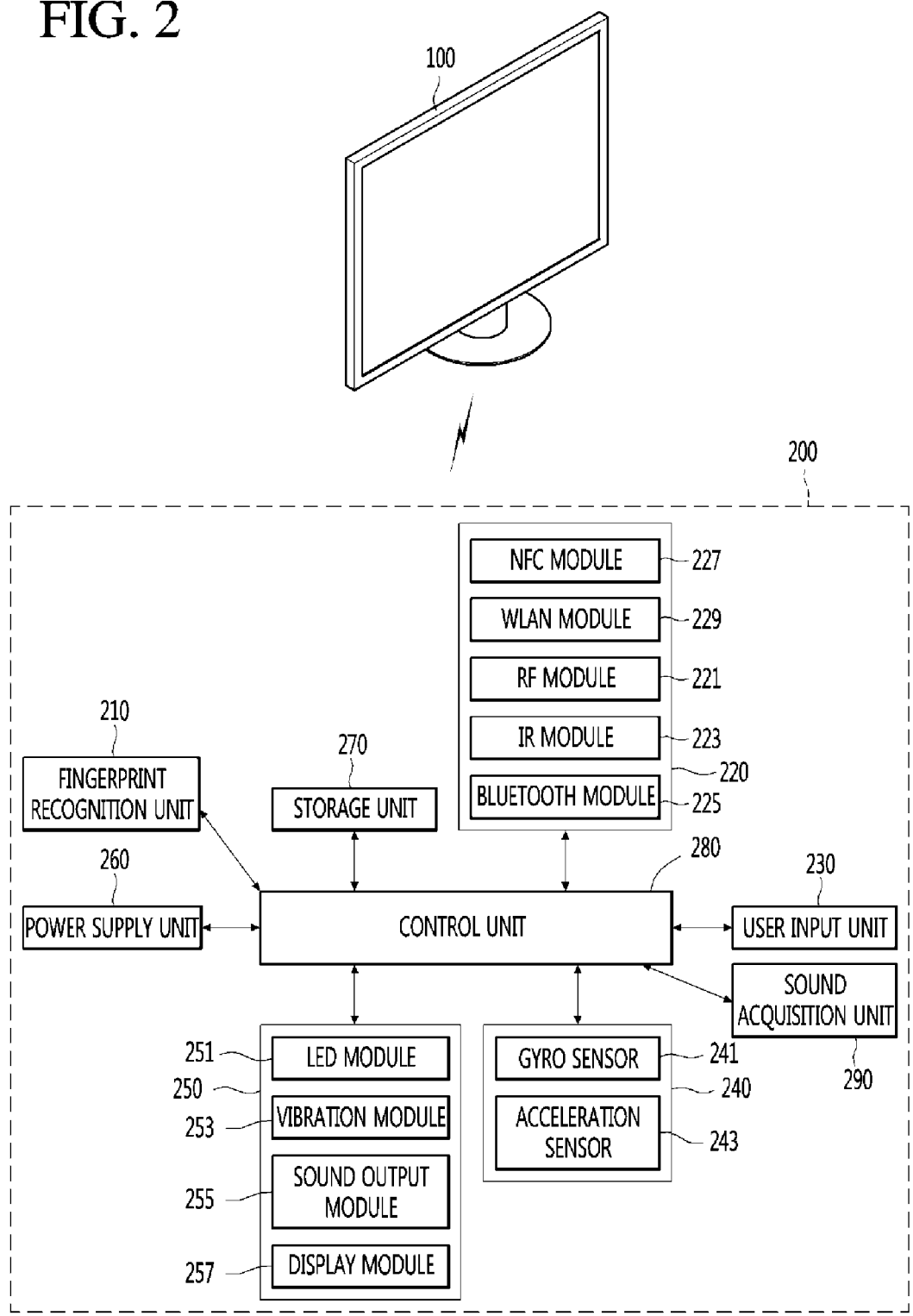
FIG. 2 is a block diagram illustrating a remote control device according to an embodiment of the present invention.
Figure 3:
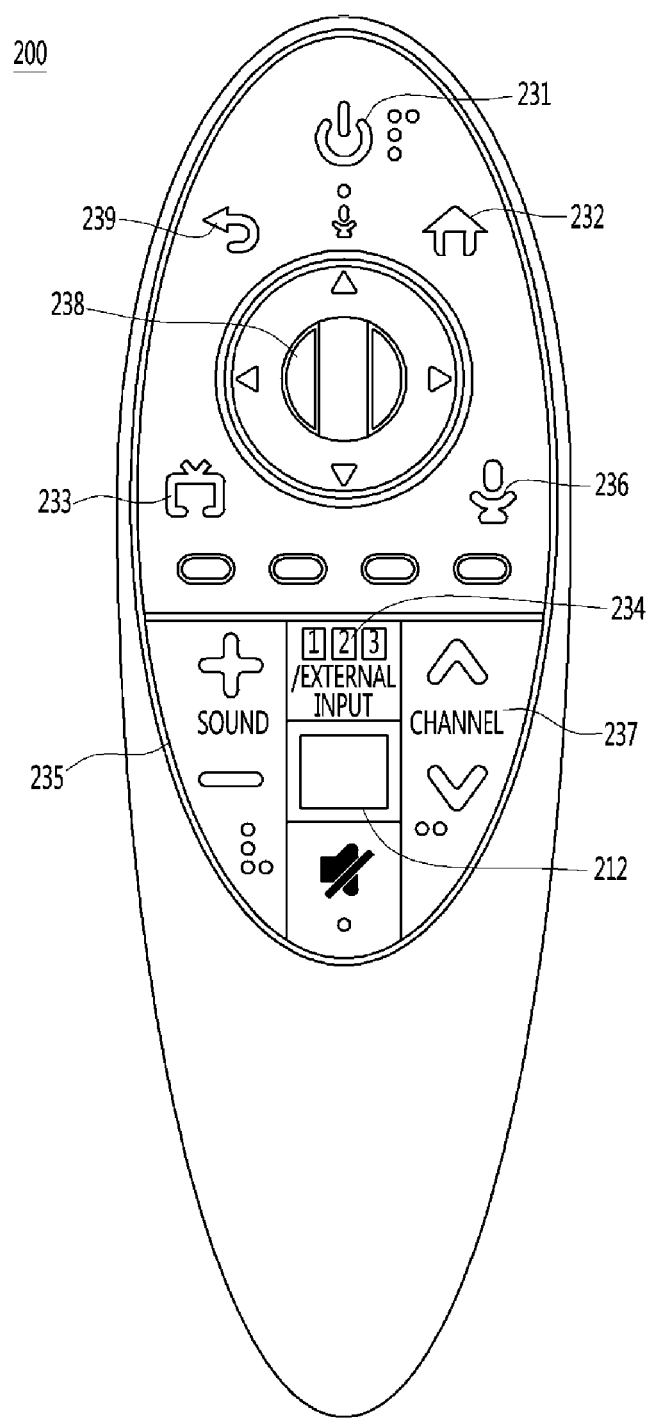
FIG. 3 is a view illustrating an actual configuration of a remote control device according to an embodiment of the present invention.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 225 transmits/receives signals to/from an arbitrary any one of display devices according to the above-mentioned embodiments of the present invention.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The power button 232 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to a manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to a control of the remote control device 200. The control unit 280 can transmit a signal corresponding to a predetermined key manipulation of the user input unit 235 or a signal corresponding to a movement of the remote control device 200 sensed by the sensor unit 240 to the display device 100 through the wireless communication unit 225.

Additionally, the voice acquisition unit 290 of the remote control device 200 can obtain voice.

The voice acquisition unit 290 can include at least one microphone 291 and obtain voice through the microphone 291.

Figure 4:
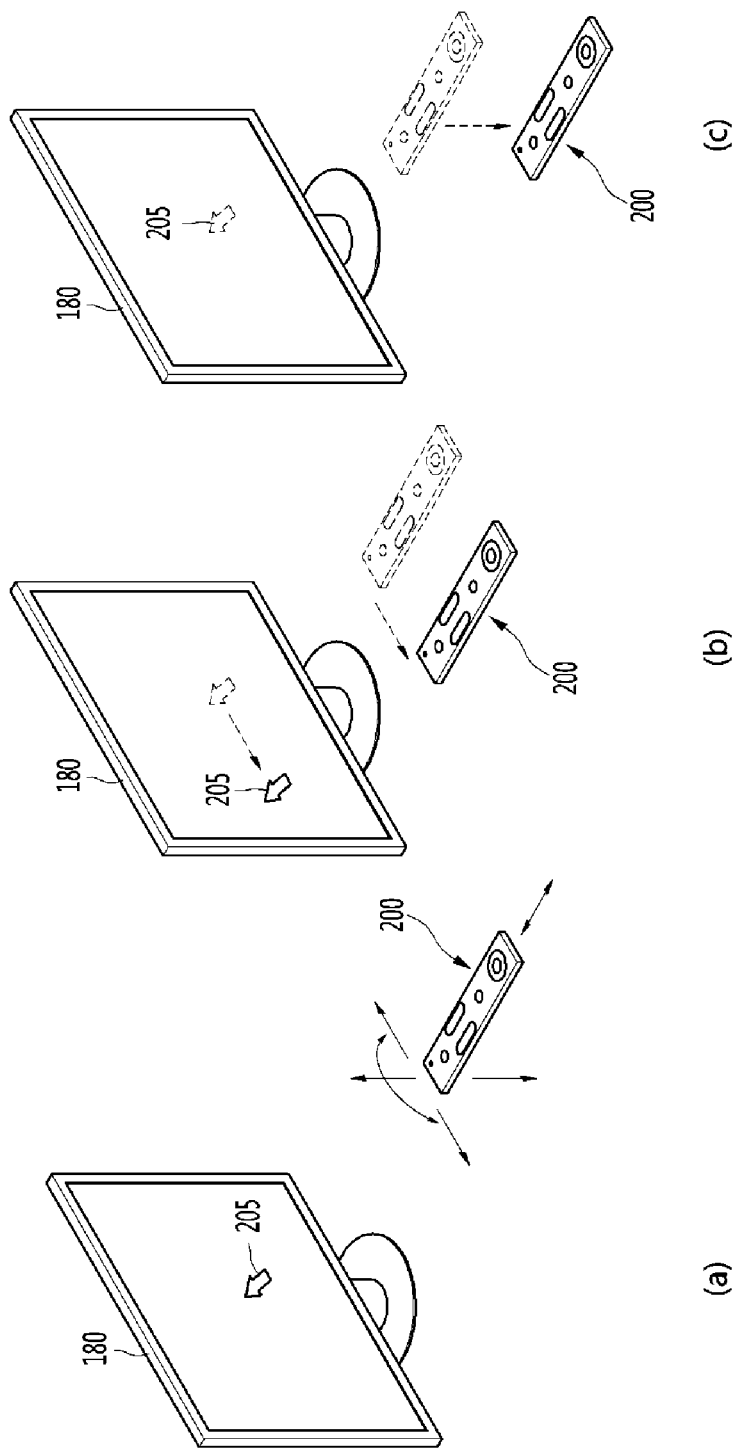
FIG. 4 is a view showing an example of utilizing a remote control device according to an embodiment of the present invention.

Then, FIG. 4 is described.

FIG. 4 is a view of utilizing a remote control device according to an embodiment of the present invention.

FIG. 4A illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display unit 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display unit 180. Thus, a selection area in the display unit 180 corresponding to the pointer 205 can be zoomed in and displayed largely.

On the other hand, if a user moves the remote control device 200 close to the display unit 180, a selection area in the display unit 180 corresponding to the pointer 205 can be zoomed out and displayed reduced.

On the other hand, if the remote control device 200 is away from the display unit 180, a selection area can be zoomed out and if the remote control device 200 is close to the display unit 180, a selection area can be zoomed in.

Additionally, if a specific button in the remote control device 200 is pressed, the recognition of a vertical or horizontal movement can be excluded. That is, if the remote control device 200 is moved away from or close to the display unit 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

FIG. 5 is a diagram showing a method of displaying an OSD window in a display device according to an embodiment of the present invention.

As shown in (a) of FIG. 5, a display device 500 according to an embodiment of the present invention may receive an output request of an OSD window using a remote control device or an external input unit through a network interface or an external device interface while an image 510 of first content is displayed on a first layer of a screen. In this case, as shown in (b) of FIG. 5, a controller of the display device 500 may perform control to display an OSD window 520 including predetermined type information in a first area of a second layer of the screen in correspondence with the output request signal of the OSD window 520. Further, the controller of the display device 500 may perform control to adjust transparency of the OSD window 520 to overlap the image 510 of the first content displayed on the first layer with the OSD window 520 displayed on the second layer. The predetermined type information displayed in the OSD window 520 may include channel list information, electronic program guide (EPG) information, recommended content information, an image output setting menu, etc. As shown in (b) of FIG. 5, the transparency of the OSD window is adjusted, such that a user may continuously view the video of content even when the OSD window is output.

Figure 6:
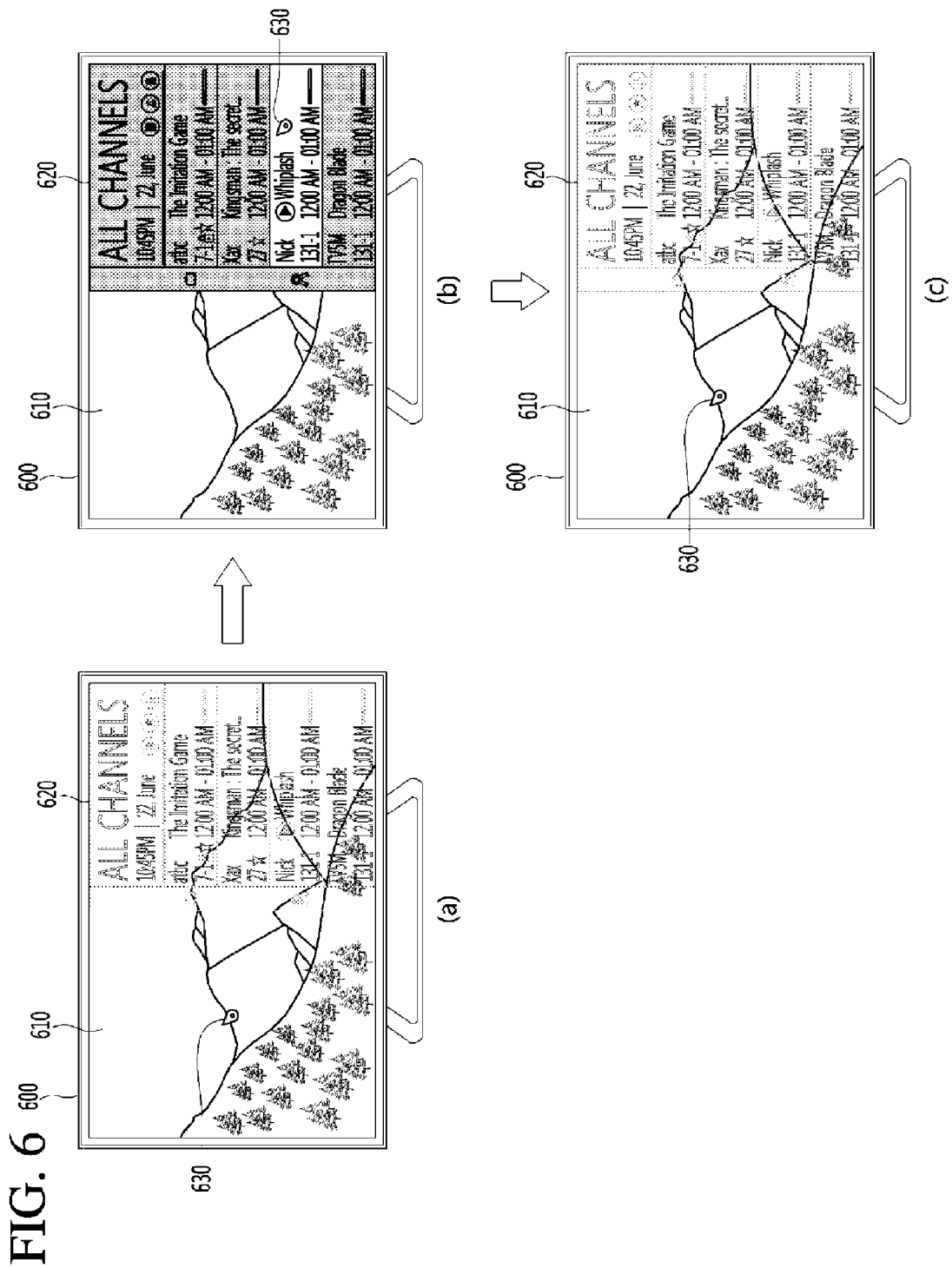
FIG. 6 is a diagram illustrating an example of changing transparency of an OSD window in correspondence with a pointer location in a display device according to an embodiment of the present invention.

FIG. 6 is a diagram illustrating an example of changing transparency of an OSD window in correspondence with a pointer location in a display device according to an embodiment of the present invention.

As shown in (a) of FIG. 6, a controller of a display device 600 according to an embodiment of the present invention may perform control to display an image 610 of first content on a first layer of a screen, to display an OSD window 620 having predetermined first transparency in a first area of a second layer of the screen upon receiving an OSD window output request signal, and to display a pointer 630 of a remote control device in a second area of the second layer of the screen. The controller of the display device 600 may perform control to display the pointer 630 only when a pointer display request is received from the remote control device. The second area of the second layer of the screen may be an area other than the first area in which the OSD window 620 is output in the overall area of the screen. As shown in (b) of FIG. 6, when the pointer 630 moves from the second area of the second layer of the screen to the first area, the controller of the display device 600 may perform control to change transparency of the OSD window 620 from the first transparency to predetermined second transparency. The first transparency may be higher than the second transparency and the user may more clearly confirm information of the OSD window 620 when the OSD window 620 has the second transparency. The controller of the display device 600 may sense coordinate information of the pointer 630 in real time and perform control to set the transparency of the OSD window 620 to the first transparency when the pointer 630 is not located in the OSD window 620 as a result of sensing the coordinate information of the pointer 630 and to set the transparency of the OSD window 620 to the second transparency when the pointer 630 is located in the OSD window 620 as a result of sensing the coordinate information of the pointer 630. Additionally, when the OSD window 620 has the second transparency, the user may not view some areas of the image 610 of the first content by the OSD window 620. At this time, the controller of the display device 600 may perform control to record and store the image 610 of the first content during a time when the OSD window 620 has the second transparency. Further, as shown in (c) of FIG. 6, when the pointer 630 moves from the first area of the second layer to the second area, the controller of the display device 600 may perform control to change the transparency of the OSD window 620 from the second transparency to the first transparency again.

Figure 7:
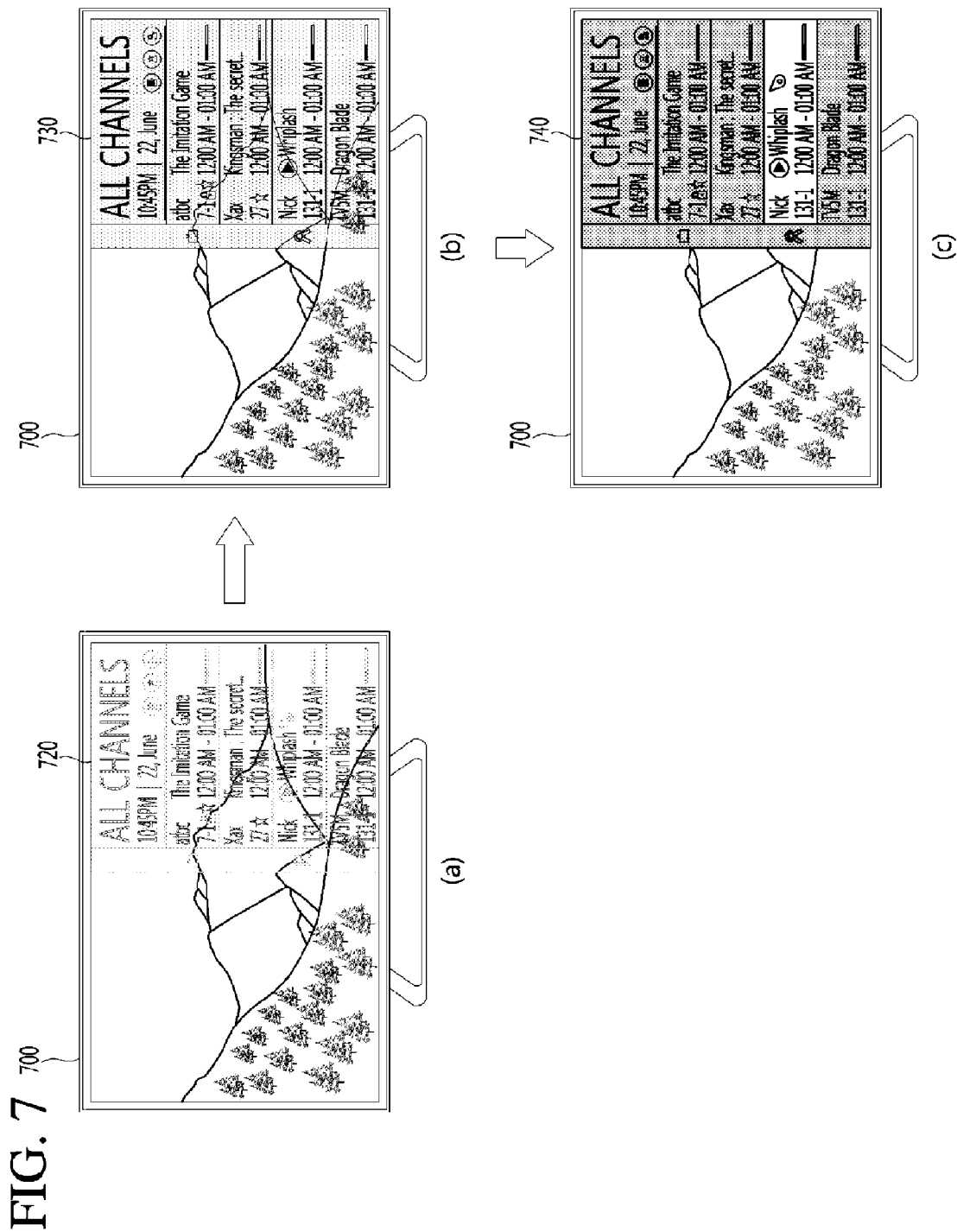
FIG. 7 is a diagram illustrating an example of displaying an OSD window using a plurality of transparencies in a display device according to an embodiment of the present invention.

FIG. 7 is a diagram illustrating an example of displaying an OSD window using a plurality of transparencies in a display device according to an embodiment of the present invention.

As shown in (a) to (c) of FIG. 7, a controller of a display device 700 according to an embodiment of the present invention may variously adjust transparency of an OSD window. For example, the controller of the display device 700 may display a first OSD window 720 having first transparency, a second OSD window 730 having second transparency and a third OSD window 740 having third transparency in a first area of a second layer of a screen in correspondence with user settings. Accordingly, the transparency of the OSD window is variously provided in correspondence with user selection, thereby increasing user convenience.

Figure 8:
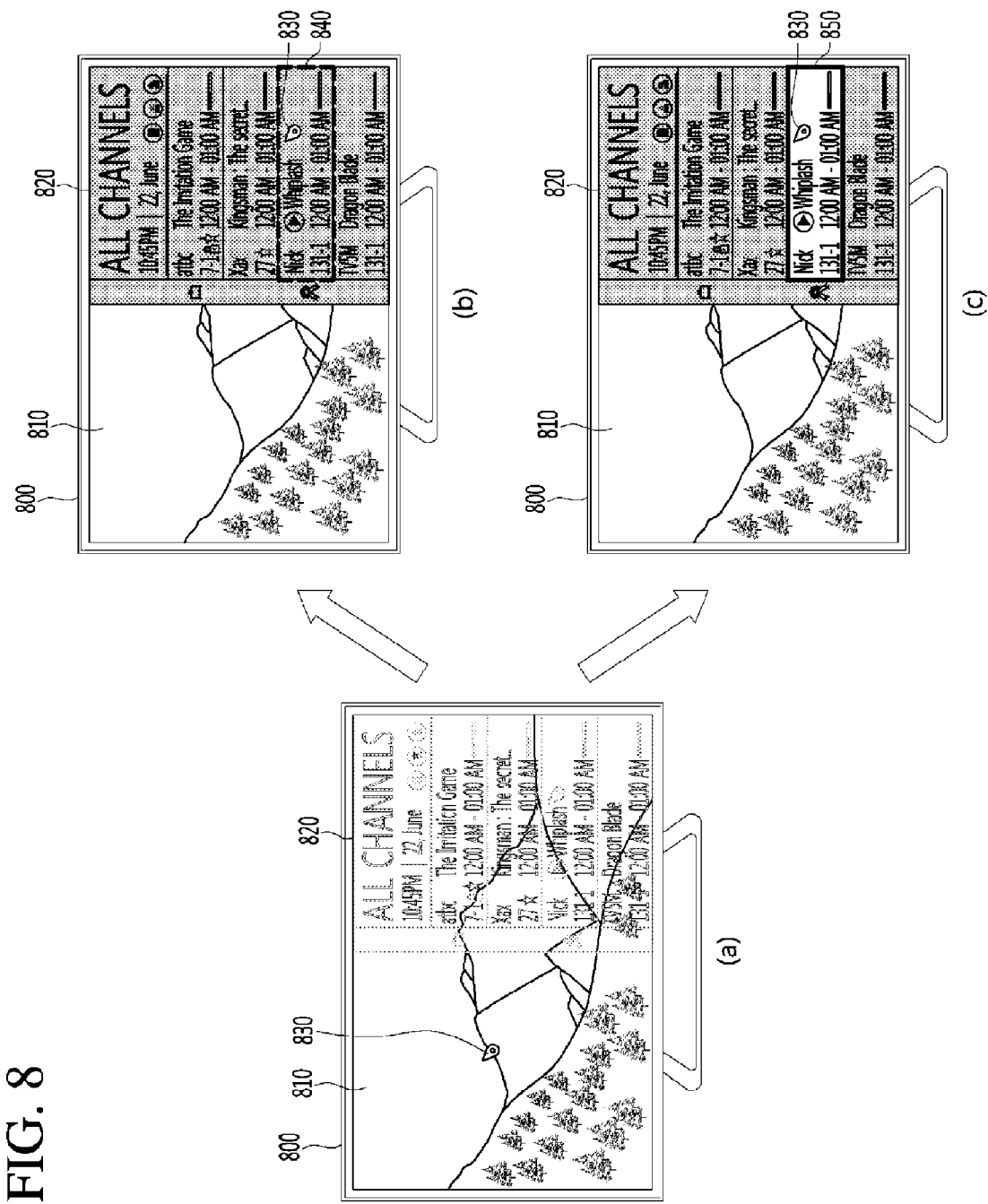
FIG. 8 is a diagram illustrating a method of increasing readability of an OSD window in a display device according to an embodiment of the present invention.

FIG. 8 is a diagram illustrating a method of increasing readability of an OSD window in a display device according to an embodiment of the present invention.

As shown in (a) of FIG. 8, a controller of a display device according to an embodiment of the present invention may perform control to display an image 810 of first content on a first layer of a screen, to display an OSD window 820 having predetermined first transparency in a first area of a second layer of the screen upon receiving an OSD window output request signal and to display a pointer 830 of a remote control device in a second area of the second layer of the screen. The OSD window 820 may include a variety of content information or a plurality of items for setting a displayed image. As shown in (b) or (c) of FIG. 8, when the pointer 830 moves from the second area of the second layer of the screen to the first area to point at least one of the plurality of items included in the OSD window 820, the controller of the display device 800 may perform control to process and display the item being pointed at by a dotted line 840 or to highlight (850) and display the item being pointed at. Further, although not shown in FIG. 8, the controller of the display device 800 may enlarge and display the item being pointed at, change and display the font of text included in the item or display a separate detailed-information window. The item being pointed at is displayed by a dotted line or is highlighted, such that a user who uses the display device can easily and rapidly confirm content displayed in the OSD window from a distance.

Figure 9:
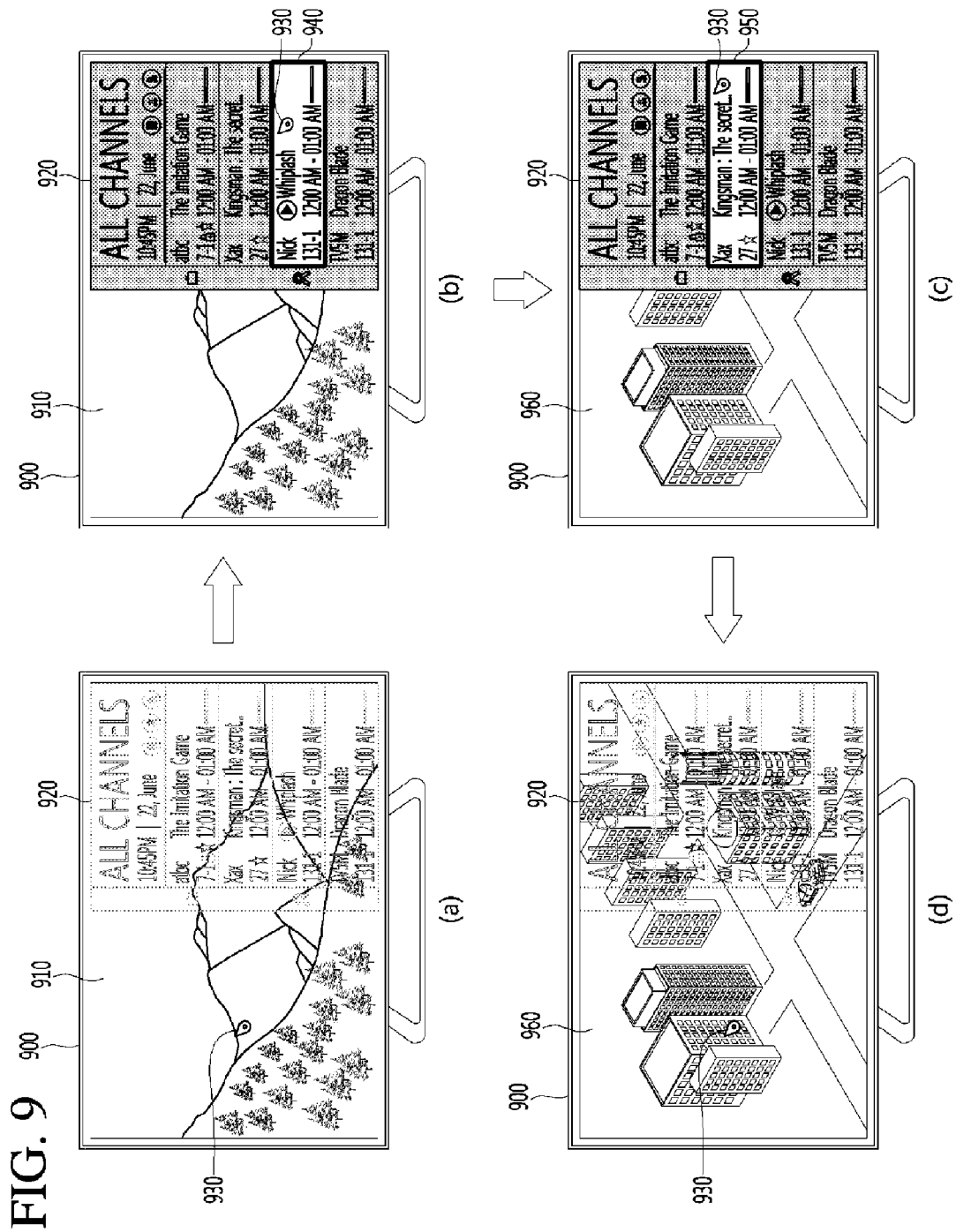
FIG. 9 is a diagram illustrating an example of changing channels in a display device according to an embodiment of the present invention.

FIG. 9 is a diagram illustrating an example of changing channels in a display device according to an embodiment of the present invention.

As shown in (a) of FIG. 9, a controller of a display device 900 according to an embodiment of the present invention may perform control to display an image 910 of first content on a first layer of a screen, to display an OSD window 920 having predetermined first transparency in a first area of a second layer of the screen upon receiving an OSD window output request signal and to display a pointer 930 of a remote control device in a second area of the second layer of the screen. The first content may be content received from a first channel and the OSD window 920 may include channel list information and a plurality of channel selection items. As shown in (b) of FIG. 9, when the pointer 930 moves from the second area of the second layer of the screen to the first area to point at least one of a plurality of items included in the OSD window 920, the controller of the display device 900 may perform control to change transparency of the OSD window 920 to second transparency and to highlight and display the item being pointed at 940. As shown in (c) of FIG. 9, when a user selects a channel selection item 950 of a second channel through the pointer 930, the controller of the display device 900 may perform control to display an image 960 of second content received from a second channel on the first layer of the screen in correspondence with the selected item. In this case, the image 910 of the first content previously displayed on the first layer of the screen may be no longer displayed and the size of the OSD window 920 may be equally maintained. As shown in (d) of FIG. 9, when the pointer 930 moves from the first area of the second layer of the screen to the second area, the controller of the display device 900 may perform control to change transparency of the OSD window 920 from the second transparency to the first transparency again.

Figure 10:
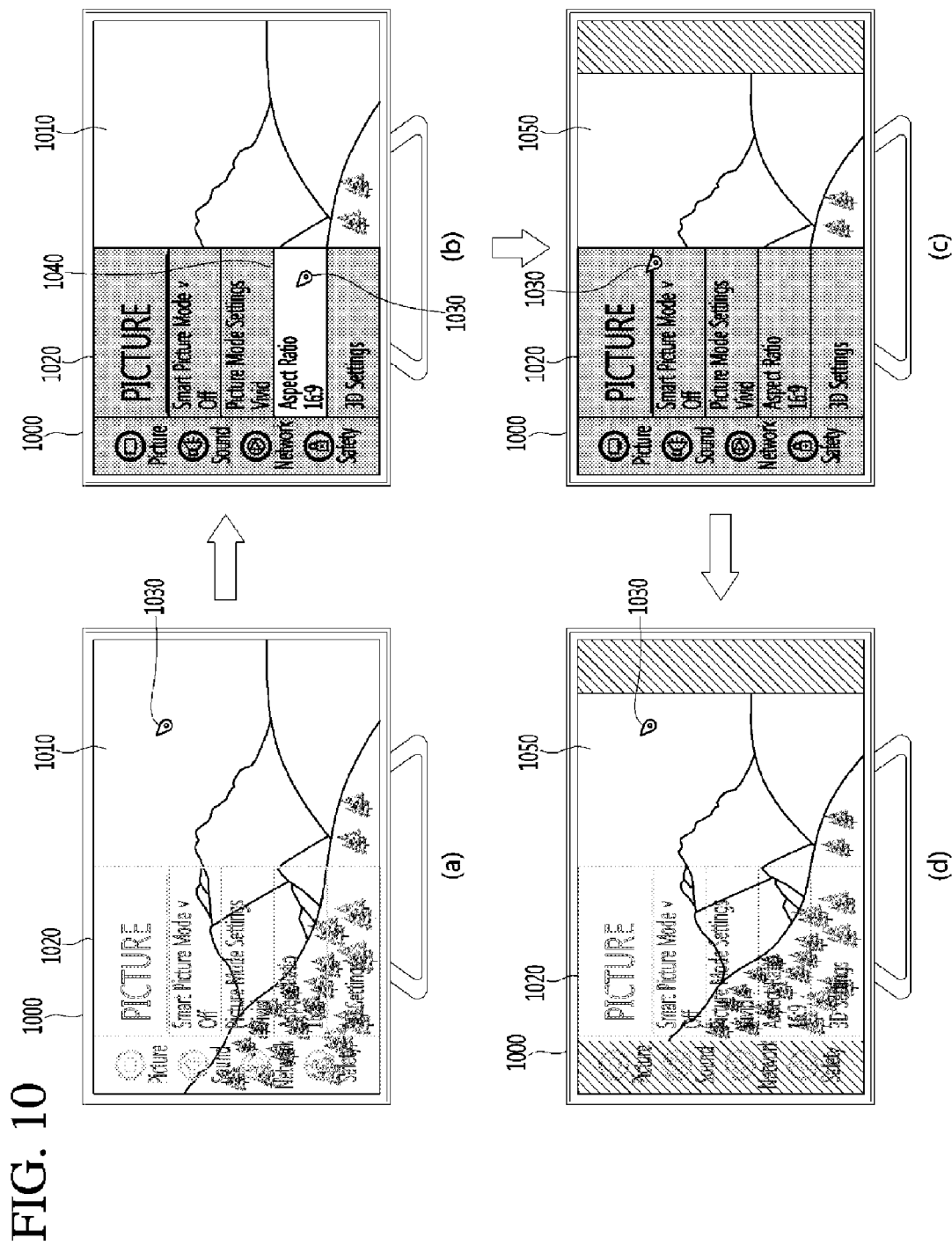
FIG. 10 is a diagram showing an example of changing screen settings in a display device according to an embodiment of the present invention.

FIG. 10 is a diagram showing an example of changing screen settings in a display device according to an embodiment of the present invention.

As shown in (a) of FIG. 10, a controller of a display device 1000 according to an embodiment of the present invention may perform control to display an image 1010 of first content on a first layer of a screen, to display an OSD window 1020 having predetermined first transparency in a first area of a second layer of the screen upon receiving an OSD window output request signal and to display a pointer 1030 of a remote control device in a second area of the second layer of the screen. The OSD window 1020 may include a plurality of screen setting items. As shown in (b) of FIG. 10, when the pointer 1030 moves from the second area of the second layer of the screen to the first area to point at least one 1040 of a plurality of items included in the OSD window 1020, the controller of the display device 1000 may perform control to change transparency of the OSD window 1020 to second transparency and to highlight and display the item being pointed at 1040. As shown in (c) of FIG. 10, when the user selects the screen setting item 1040 through the pointer 1030, the controller of the display device 1000 may perform control to display an image 1050 of the first content, to which a screen setting value corresponding to the selected item is applied, on the first layer of the screen. As shown in (d) of FIG. 10, when the pointer 1030 moves from the first area of the second layer of the screen to the second area, the controller of the display device 1000 may perform control to change transparency of the OSD window from the second transparency to the first transparency again FIG. 11 is a diagram illustrating an example of displaying a recommended content OSD window in a display device according to an embodiment of the present invention.

Figure 11:
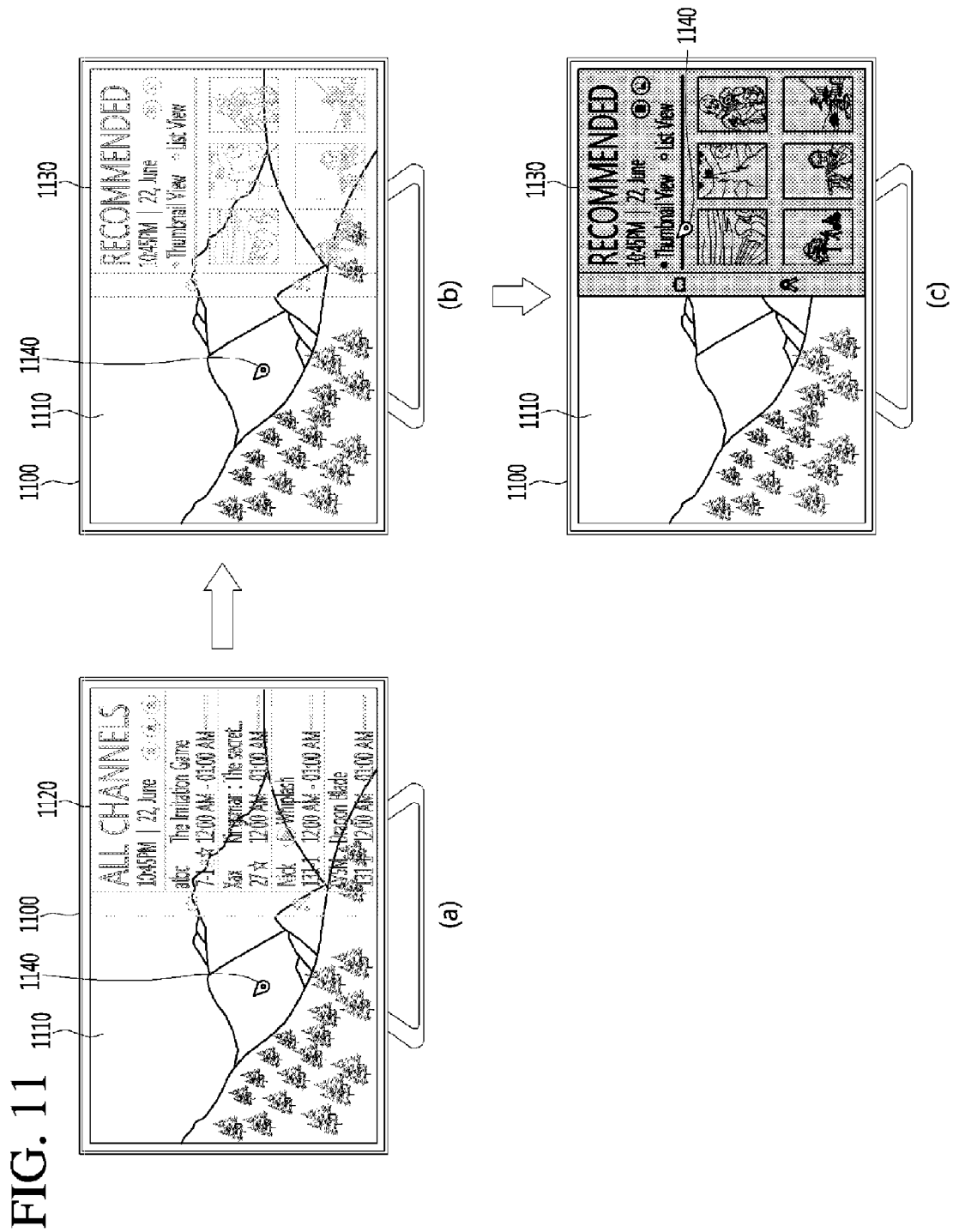
FIG. 11 is a diagram illustrating an example of displaying a recommended content OSD window in a display device according to an embodiment of the present invention.

As shown in (a) of FIG. 11, a controller of a display device 1100 according to an embodiment of the present invention may perform control to display an image 1110 of first content on a first layer of a screen, to display a first OSD window 1120 having predetermined first transparency in a first area of a second layer of the screen upon receiving an OSD window output request signal, and to display a pointer 1140 of a remote control device in a second area of the second layer of the screen. As shown in (b) of FIG. 11, when a predetermined time has elapsed after the first OSD window 1120 is displayed, the controller of the display device 1100 may perform control to display a second OSD window 1130 including a plurality of recommended content items and having first transparency in the first area of the second layer of the screen. When no signal is input during a predetermined time after the first OSD window 1120 is displayed, the second OSD window may be displayed. When the second OSD window 1130 is displayed, the first OSD window 1120 may be removed. Further, as shown in (c) of FIG. 11, when the pointer 1140 moves from the second area of the second layer of the screen to the first area, the controller of the display device 1100 may perform control to change transparency of the second OSD window 1130 from the first transparency to predetermined second transparency.

Figure 12:
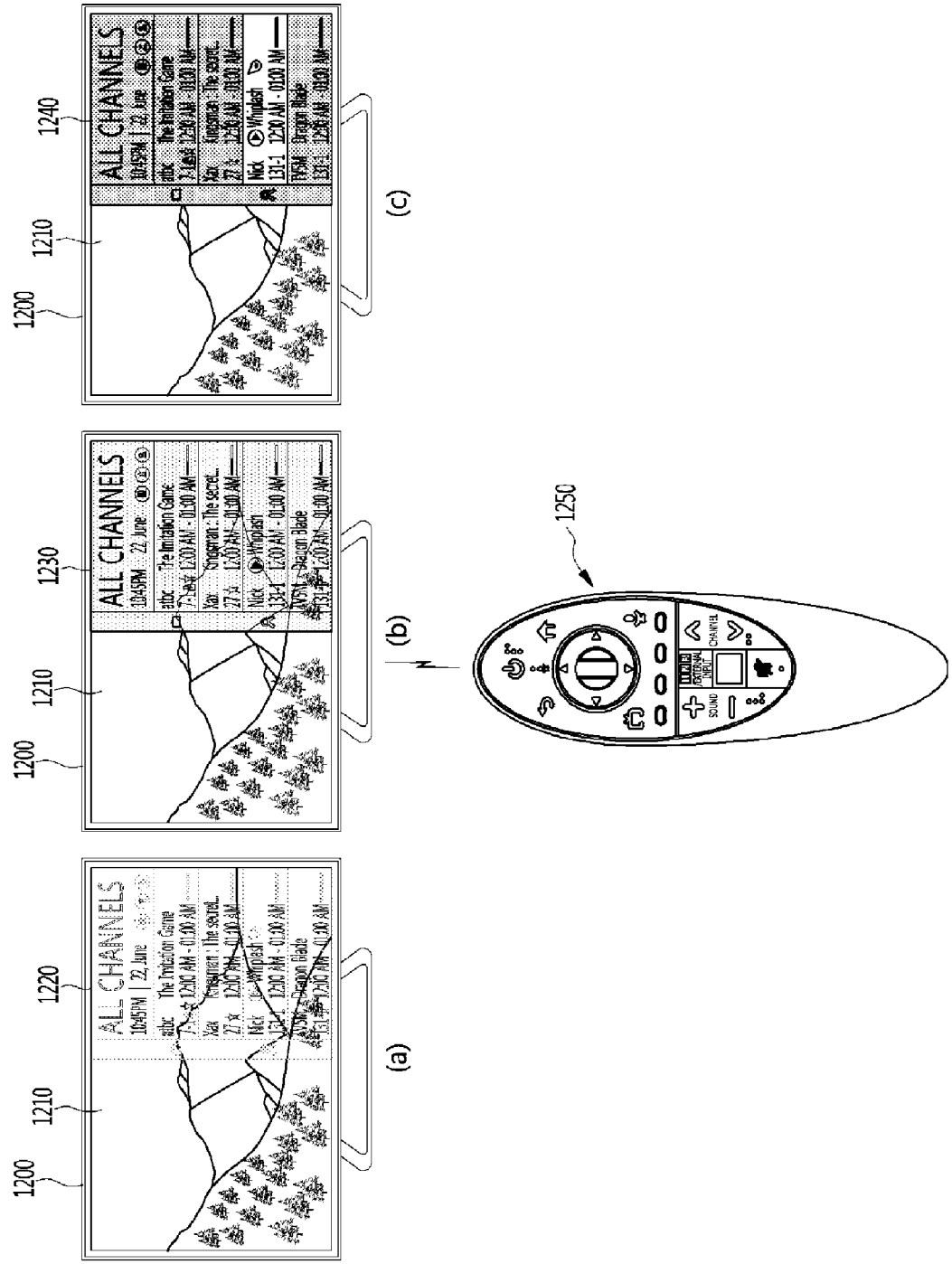
FIG. 12 is a diagram illustrating an example of controlling transparency of an OSD window displayed on a display device according to an embodiment of the present invention using a remote control device.

FIG. 12 is a diagram illustrating an example of controlling transparency of an OSD window displayed on a display device according to an embodiment of the present invention using a remote control device.

A display device 1200 according to an embodiment of the present invention may be connected to a remote control device 1250 and a user may control output of the display device 1200 using the remote control device 1250. The user may adjust transparency of the OSD windows 1220, 1230 and 1240 using an up key and down key included in the remote control device 1250 or adjust transparency of the OSD windows 1220, 1230 and 1240 using operation for moving the remote control device 1250 in a state of pressing a specific button of the remote control device 1250. The user can rapidly and conveniently adjust transparency of the OSD window using the remote control device to increase convenience of the user who views a content image displayed on the first layer.

Figure 13:
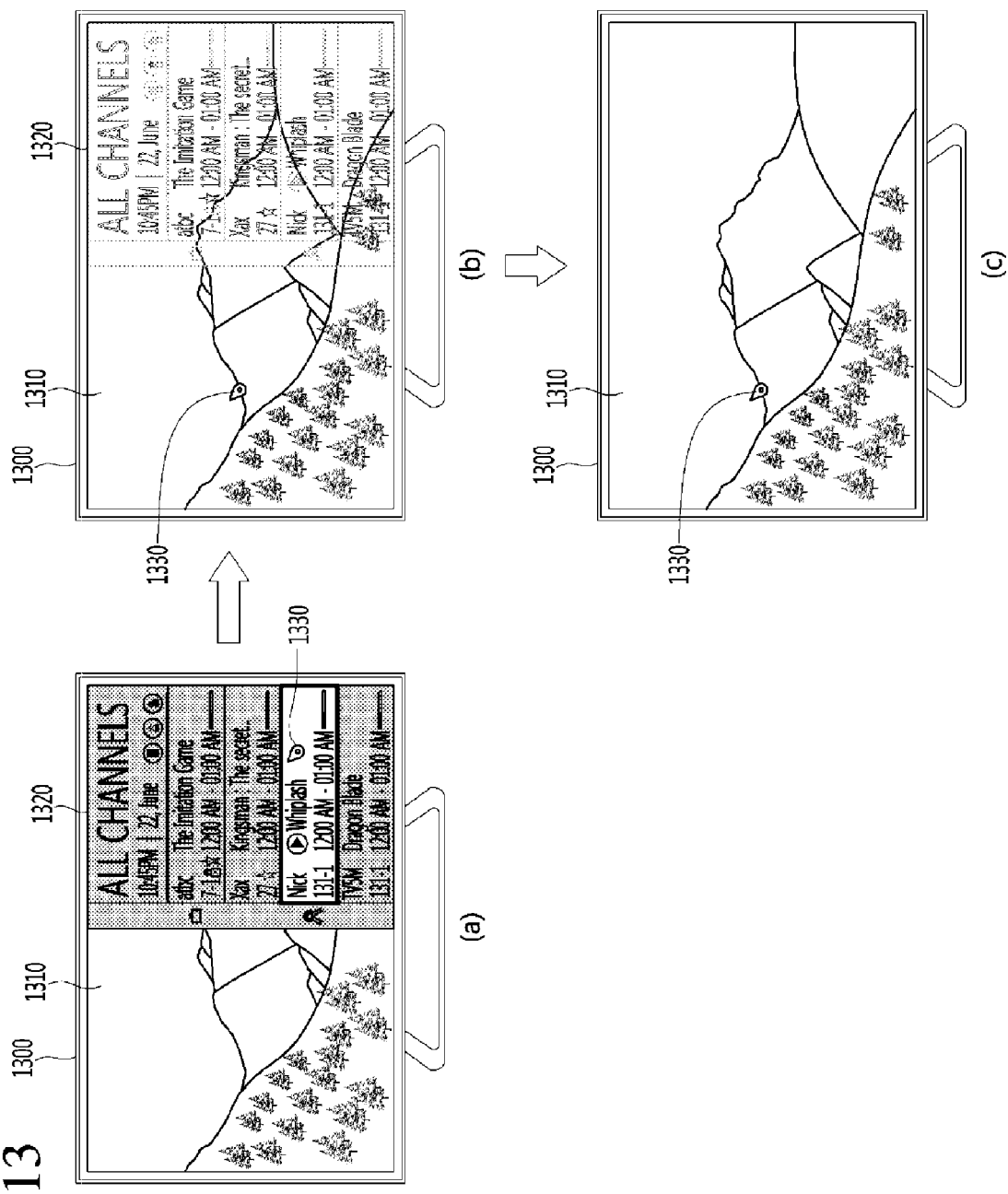
FIG. 13 is a diagram illustrating an example of removing an OSD window in a display device according to an embodiment of the present invention.

FIG. 13 is a diagram illustrating an example of removing an OSD window in a display device according to an embodiment of the present invention.

As shown in (a) of FIG. 13, a controller of a display device 1300 according to an embodiment of the present invention may perform control to display an image 1310 of first content on a first layer of a screen, to display an OSD window 1320 having predetermined second transparency in a first area of a second layer of the screen upon receiving an OSD window output request signal and to display a pointer 1330 of a remote control device in the first area of the second layer of the screen. As shown in (b) of FIG. 13, when the pointer 1330 moves from the first area of the second layer of the screen to the second area, the controller of the display device 1300 may perform control to change transparency of the OSD window 1320 from the second transparency to the first transparency. Further, as shown in (c) of FIG. 13, when the pointer 1330 is located in the second area of the second layer of the screen and at least one input signal is received from the remote control device, the controller of the display device 1300 may perform control to remove the OSD window 1320. By this design, the user can easily and conveniently control output of the OSD window using the remote control device.

FIG. 14 is a flowchart illustrating a method of controlling a display device according to an embodiment of the present invention.

As shown in FIG. 14, a method of controlling a display device according to an embodiment of the present invention may include step S1410 of displaying a video of first content in an overall area of a first layer of a screen, step S1420 of displaying a first OSD window having predetermined first transparency in a first area of a second layer of the screen upon receiving a first OSD window output request signal, and step S1430 of changing first transparency to predetermined second transparency when a pointer is located in the first area of the second layer of the screen. A detailed description of the steps is equal to the above description and thus a repeated description will be omitted.

According to an embodiment of the present invention, the above-described method is implemented as code that can be written to a processor-readable recording medium and can thus be read by a processor. Examples of the processor-readable recording medium include a ROM, a RAM, a CD-ROM, a magnetic tape, a floppy disk, an optical data storage, and a carrier wave (e.g., data transmission over the Internet).

The display device according to the present invention should not be limited to configurations and methods of the above-described embodiments, and all or some of the embodiments may be selectively combined with one another to achieve various alterations.

What is claimed is:

1. A display device comprising:
a display configured to display content;
a user input interface configured to receive a signal from a remote control device; and
a controller configured to:
cause the display to display a video of first content on a first layer of a screen;
cause the display to display a first on screen display (OSD) window in a first area of a second layer of the screen in response to a first OSD window output request received via the user input interface;
set a transparency of the displayed first OSD window to a predetermined first transparency when a pointer of the remote control device is detected at a second area of the second layer of the screen; and
set the transparency of the displayed first OSD window to a predetermined second transparency which is lower than the first transparency when the pointer is detected at the first area of the second layer of the screen,
wherein the second area of the second layer of the screen and the first area of the second layer of the screen are different areas with respect to an overall area of the screen, and
wherein when the first OSD window is displayed, the controller is further configured to cause the display to display the pointer at the first area of the second layer of the screen or at the second area of the second layer of the screen according to a set location of the pointer.

2. The display device according to claim 1, wherein:
the first OSD window includes a plurality of items, and
the controller is further configured to cause the display to highlight and display an item of the plurality of items when the pointer is positioned at the item.

3. The display device according to claim 1, wherein:
the first OSD window includes a plurality of channel selection items, and
the controller is further configured to cause the display to display a video of second content received from a channel corresponding to a selected channel selection item from the plurality of channel selection items in response to a selection of the channel selection item received via the user input interface.

4. The display device according to claim 1, wherein:
the first OSD window includes a plurality of screen setting items, and the controller is further configured to cause the display to apply a selected screen setting to the displayed first content in response to a selection of the screen setting from the plurality of screen setting items received via the user input interface.

5. The display device according to claim 1, wherein the controller is further configured to cause the display to display a second OSD window in the first area of the second layer when a predetermined time has elapsed after the first OSD window is displayed, wherein the second OSD window includes a plurality of recommended content items and is displayed in the first transparency.

6. The display device according to claim 5, wherein the controller is further configured to cause the display to display a video of second content corresponding to a selected recommended content item in response to a selection of the recommended content item from the plurality of recommended content items received via the user input interface.

7. The display device according to claim 1, wherein the controller is further configured to cause the display to terminate display of the first OSD window when at least one input is received from the remote control device while the pointer is detected at the second area of the second layer of the screen.

8. The display device according to claim 1, wherein the controller is further configured to:
detect coordinate information of the pointer;
set transparency of the first OSD window to the second transparency when the detected coordinate information corresponds to the first area of the second layer of the screen; and
set transparency of the first OSD window to the first transparency when the detected coordinate information corresponds to the second area of the second layer of the screen.

9. A method for displaying content on a display device, the method comprising:
displaying a video of first content on a first layer of a screen;
displaying a first on screen display (OSD) window in a first area of a second layer of the screen in response to a first OSD window output request;
setting a transparency of the displayed first OSD window to a predetermined first transparency when a pointer of a remote control device is detected at a second area of the second layer of the screen; and
setting the transparency of the displayed first OSD window to a predetermined second transparency which is lower than the first transparency when the pointer is detected at the first area of the second layer of the screen,
wherein the second area of the second layer of the screen and the first area of the second layer of the screen are different areas with respect to an overall area of the screen, and wherein displaying the first OSD window further comprises displaying the pointer at the first area of the second layer of the screen or at the second area of the second layer of the screen according to a set location of the pointer.

10. The method according to claim 9, wherein:
the first OSD window includes a plurality of items, and
the method further comprises highlighting and displaying an item of the plurality of items when the pointer is pointed at the item.

11. The method according to claim 9, wherein:
the first OSD window includes a plurality of channel selection items, and
the method further comprises displaying a video of second content received from a channel corresponding to a selected channel selection item from the plurality of channel selection items in response to a selection of the channel selection item.

12. The method according to claim 9, wherein:
the first OSD window includes a plurality of screen setting items, and
the method further comprises applying a selected screen setting to the displayed first content in response to a selection of the screen setting from the plurality of screen setting items.

13. The method according to claim 9, further comprising displaying a second OSD window in the first area of the second layer when a predetermined time has elapsed after the first OSD window is displayed, wherein the second OSD window includes a plurality of recommended content items and is displayed in the first transparency.

14. The method according to claim 13, further comprising displaying a video of second content corresponding to a selected recommended content item in response to a selection of the recommended content item from the plurality of recommended content items.

15. The method according to claim 9, further comprising terminating display of the first OSD window when at least one input is received from the remote control device while the pointer is located in the second area of the second layer of the screen.

16. The method according to claim 9, further comprising:
detecting coordinate information of the pointer;
setting transparency of the first OSD window to the second transparency when the detected coordinate information corresponds to the first area of the second layer of the screen; and
setting transparency of the first OSD window to the first transparency when the detected coordinate information corresponds to the second area of the second layer of the screen.

* * * * *